United States Patent
Watanabe (10) Patent No.: US 6,315,018 B1
(45) Date of Patent: *Nov. 13, 2001

(54) PNEUMATIC TIRE HAVING SIPE STRUCTURED BY NARROW GROOVE PORTION AND WIDE GROOVE PORTION

(75) Inventor: Shinichi Watanabe, Tokyo (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,349

(22) Filed: Nov. 19, 1998

(30) Foreign Application Priority Data

Nov. 19, 1997 (JP) .................................................. 9-318706

(51) Int. Cl.$^7$ ........................... B60C 11/12; B60C 11/13; B60C 103/00; B60C 103/04
(52) U.S. Cl. ............................. 152/209.21; 152/DIG. 3; 152/903
(58) Field of Search .................. 152/209.17, 209.18, 152/209.21, DIG. 3, 903

(56) References Cited

U.S. PATENT DOCUMENTS

| | | | |
|---|---|---|---|
| 2,612,928 | * 10/1952 | Buddenhagen | 152/DIG. 3 |
| 4,723,584 | * 2/1988 | Yamaguchi et al. | 152/DIG. 3 |
| 5,176,765 | * 1/1993 | Yamaguchi et al. | 152/DIG. 3 |
| 5,343,918 | * 9/1994 | Fontaine | 152/DIG. 3 |
| 5,385,189 | * 1/1995 | Aoki et al. | 152/DIG. 3 |
| 5,766,383 | * 6/1998 | Hasegawa et al. | 152/903 |
| 5,814,169 | * 9/1998 | Yamaguchi et al. | 152/DIG. 3 |

FOREIGN PATENT DOCUMENTS

| | | | |
|---|---|---|---|
| 3603899 A1 | 9/1986 | (DE) . | |
| 737817 | * 6/1943 | (DE) | 152/209.21 |
| 1920216 | 11/1969 | (DE) | 152/209.21 |
| 540340 A2 | 5/1993 | (EP) . | |
| 1150295 | * 4/1969 | (GB) | 152/DIG. 3 |
| 2-310109 | 12/1990 | (JP) . | |
| 2-310108 | * 12/1990 | (JP) . | |
| 1-101205 | * 4/1989 | (JP) | 152/209.21 |
| 2-241806 | 9/1990 | (JP) | 152/209.21 |
| 2-267009 | 10/1990 | (JP) | 152/209.21 |
| 2-303908 | * 12/1990 | (JP) | 152/209.21 |
| 4-345504 | * 12/1992 | (JP) | 152/209.21 |
| 5-178030 | * 7/1993 | (JP) | 152/209.21 |
| 6-143943 | 5/1994 | (JP) | 152/209.21 |
| 62-241712 | * 10/1987 | (JP) | 152/DIG. 3 |

* cited by examiner

*Primary Examiner*—Steven D. Maki
(74) *Attorney, Agent, or Firm*—Sughrue, Mion, Zinn, Macpeak & Seas, PLLC (57) ABSTRACT

A sipe formed in a block is structured, in a depthwise direction of the sipe, by a narrow groove portion formed at a ground-contact surface side of the sipe and a wide groove portion formed at a bottom portion side of the sipe and wider than the narrow wide portion. A portion connecting the narrow groove portion and the wide groove portion is inclined along a longitudinal direction of the sipe. When a pneumatic tire having a tread surface on which such blocks are formed is worn, wear proceeds as follows. At an initial stage of wear during which draining performance of main grooves is excellent, only the narrow groove portion is exposed so that noise is suppressed. At an intermediate stage of wear during which draining performance of the main grooves deteriorates, the wide groove portion is gradually exposed, and the draining performance of the sipe improves to compensate for deterioration of the draining performance of the main grooves. At a final stage of wear, only the wide groove portion remains, and because a depth of the sipe is small, noise is suppressed. In this way, noise can be suppressed until the final stage of wear of the tire, and at the same time, deterioration in wet performance of the tire can be suppressed.

23 Claims, 10 Drawing Sheets

PNEUMATIC TIRE HAVING SIPE STRUCTURED BY NARROW GROOVE PORTION AND WIDE GROOVE PORTION

BACKGROUND OF THE INVENTION

1. Field of the Invention

The present invention relates to a pneumatic tire in which deterioration in wet performance of the tire due to wear of the tire can be suppressed.

2. Description of the Related Art

Conventionally, in pneumatic radial tires, especially tires for passenger cars, in order to improve the ground-contact performance, the wet performance, and wear resistance, and in order to reduce noise, a method in which sipes are provided in block-shaped land portions or in ribs formed on a tread surface of the tire has been employed. Accordingly, edge components can be increased, and the rigidity of the blocks can be controlled.

Ordinarily, in the case of improving wet performance, narrow sipes are formed in the block-shaped land portions. By making narrow sipes, the edge components can be increased and the rigidity of the block-shaped land portions can be ensured. However, in the case in which narrow sipes are formed in the block-shaped land portions, although the edge components can be ensured sufficiently, there is a problem with draining performance. Namely, in a tire having such sipes formed therein, at the initial stage of wear of the tire, sufficient draining performance can be obtained by main grooves or the like which are formed in the tread surface. However, in a later stage of wear of the tire, because the draining performance of the main grooves or the like deteriorates, the sipes must also exhibit the ability to drain. However, if the sipes are narrow, the draining performance is low, and it is thus difficult to ensure a sufficient wet performance.

In order to improve the draining performance of the sipes, it is desirable to increase the widths of the sipes. However, in this case, there is the concern that the rigidity of the blocks may decrease, and accordingly, the stability and controllability performance may deteriorate greatly. Further, if the width of the sipe is increased, the amount of noise may increase.

A tire in which sipes are made wider only at portions of the sipes which are exposed in the final stage of wear of the tire has been proposed. However, with this tire, there is the drawback that the draining performance of the sipes deteriorates at the intermediate stage of wear and the wet performance deteriorates.

SUMMARY OF THE INVENTION

In view of the aforementioned, it is an object of the present invention to provide a pneumatic tire in which deterioration in wet performance due to wear of the tire is suppressed, and noise is also suppressed.

The first aspect of the present invention is a pneumatic tire having a tread on which a plurality of block-shaped land portions which are demarcated by a plurality of grooves intersecting each other are formed, and in which a sipe is provided in the block-shaped land portion, wherein the sipe is structured by a narrow groove portion, which is formed at a tire ground contact surface side of the sipe and has a first width, and a wide groove portion, which is formed at a bottom portion side of the sipe and has a second width greater than the first width, and toward the bottom portion of the sipe, the proportion of the sipe accounted for by the narrow groove portion in a longitudinal direction of the sipe which is orthogonal to a depthwise direction of the sipe decreases, while the proportion of the sipe accounted for by the wide groove portion in the longitudinal direction of the sipe which is orthogonal to the depthwise direction of the sipe increases.

In accordance with the first aspect of the present invention, when the vehicle travels with such pneumatic tires installed thereon, at the initial stage of wear, sufficient depths of the respective grooves (main grooves, lug grooves and the like) are ensured, and an excellent draining performance is exhibited. Further, because the proportion of the exposed portion of the sipe accounted for the narrow groove portion is large, the surface area of the exposed portion of the sipe is small, and there is little noise. At the intermediate stage of wear of the tire, the depths of the grooves decrease, and the draining performance deteriorates. However, because the proportion of the exposed portion of the sipe accounted for the wide groove portion increases, the exposed surface area of the sipe increases. The deterioration in the draining performance of the grooves can be compensated for by the improvement in the draining performance of the sipes, and the excellent wet performance of the tire can be maintained. At the final stage of wear of the tire in which the depths of the grooves decrease even more, most of the exposed portion of the sipe is occupied by the wide groove portion, and the exposed surface area of the sipe is thereby increased. Thus, the deterioration in the draining performance of the respective grooves can be compensated for even more. In this case, although the surface area of the exposed portion of the sipe increases, noise can be suppressed because the depth of the sipe is small.

In this way, when a vehicle on which pneumatic tires according to the first aspect of the present invention are mounted travels, a good draining performance (wet performance) can be maintained throughout the stages of wear of the tire, and noise can be suppressed.

The second aspect of the present invention is a pneumatic tire, wherein the sipe is an open sipe in which at least one of the longitudinal direction end portions of the sipe is open at a groove of the plurality of grooves, and the wide groove portion is formed continuously in the longitudinal direction of the sipe from the at least one of the end portions of the sipe.

In accordance with the second aspect of the present invention, the wide groove portion is continuously formed from at least one end portion of the sipe open at a groove of the grooves which section the block-shaped land portions. Accordingly, the water which is absorbed by the sipe is drained into the groove or grooves quickly. Therefore, the draining performance in the sipe is further improved.

The third aspect of the present invention is a pneumatic tire in which the sipe is a one-side-open sipe in which one of the longitudinal direction end portions of the sipe is open at a groove of the plurality of grooves, and in the longitudinal direction of the sipe, the proportion of the sipe accounted for by the wide groove portion in the depthwise direction of the sipe increases toward the one end portion of the sipe.

In accordance with the third aspect of the present invention, in a case in which a one-side-open sipe is formed at the block-shaped land portion, the proportion of the sipe occupied by the wide groove portion in the depthwise direction of the sipe increases toward the one longitudinal direction end portion of the sipe which is open at a groove. Namely, the water which is absorbed by the sipe is drained quickly from the one end portion into the groove. Accordingly, an excellent draining performance of the one-side-open sipe can be ensured.

The fourth aspect of the present invention is a pneumatic tire in which the sipe is a both-sides-open sipe in which both longitudinal direction end portions of the sipe are open at grooves of the plurality of the grooves, and the proportion accounted for by the wide groove portion of the sipe in the depthwise direction of the sipe increases toward the end portions from an intermediate portion between the end portions of the sipe in the longitudinal direction thereof.

In accordance with the fourth aspect of the present invention, in the case in which a both-sides-open sipe is formed in the block-shaped land portion, the proportion of the sipe occupied by the wide groove portion in the depthwise direction of the sipe increases toward the end portions, from the intermediate portion between the end portions in the longitudinal direction of the sipe. Namely, the water which is absorbed by the sipe drains rapidly from the end portions of the sipe into the grooves. As a result, an excellent draining performance of the both-sides-open sipe can be ensured.

The fifth aspect of the present invention is a pneumatic tire wherein the sipe is formed only by the narrow groove portion from a ground-contact surface to a first depth.

In accordance with the fifth aspect of the present invention, because only the narrow groove portion of the sipe is exposed during the period of time in which the draining performance of the grooves is satisfactory, the wet performance can be ensured, and at the same time, noise can be suppressed even more.

The sixth aspect of the present invention is a pneumatic tire, wherein the first depth is a depth at a position of 10% of the total depth of the sipe from the ground-contact surface.

In accordance with the sixth aspect of the present invention, because it is empirically known that a sufficient draining performance of the groove can be ensured until a position at 10% of the total depth of the sipe, the draining performance of the sipe does not contribute to the overall draining performance of the tire. As a result, if the sipe is structured only by the narrow groove portion to this depth, noise can be suppressed and an excellent wet performance can be maintained.

The seventh aspect of the present invention is a pneumatic tire, wherein the sipe is formed only by the wide groove portion from a second depth to the bottom portion of the sipe.

In accordance with the seventh aspect of the present invention, at the final stage of wear, the depth of the groove becomes small, and the draining performance is not satisfactory. On the other hand, the exposed portion of the sipe is formed only by the wide groove portion from a predetermined depth at which the depth of the sipe is sufficiently small and noise can be sufficiently suppressed. As a result, the draining performance of the sipe can be ensured, deterioration in the draining performance of the grooves can be compensated for, and deterioration in the wet performance of the tire can be suppressed.

The eighth aspect of the present invention is a pneumatic tire, wherein the second depth is a depth at a position of 60% of the total depth of the sipe from a tire ground-contact surface.

In accordance with the eighth aspect of the present invention, because it is empirically known that, from a position at 60% of the total depth of the sipe to the bottom portion of the sipe, the depth of the sipe is small and thus noise is suppressed at this region. Accordingly, if the sipe is structured only by the wide groove portion from this depth, the noise is suppressed and the draining performance is improved so that an excellent wet performance of the tire can be maintained.

DESCRIPTION OF THE PREFERRED EMBODIMENTS

With reference to FIGS. 1 through 6, a description of the present embodiment will be given hereinafter.

Figure 1:
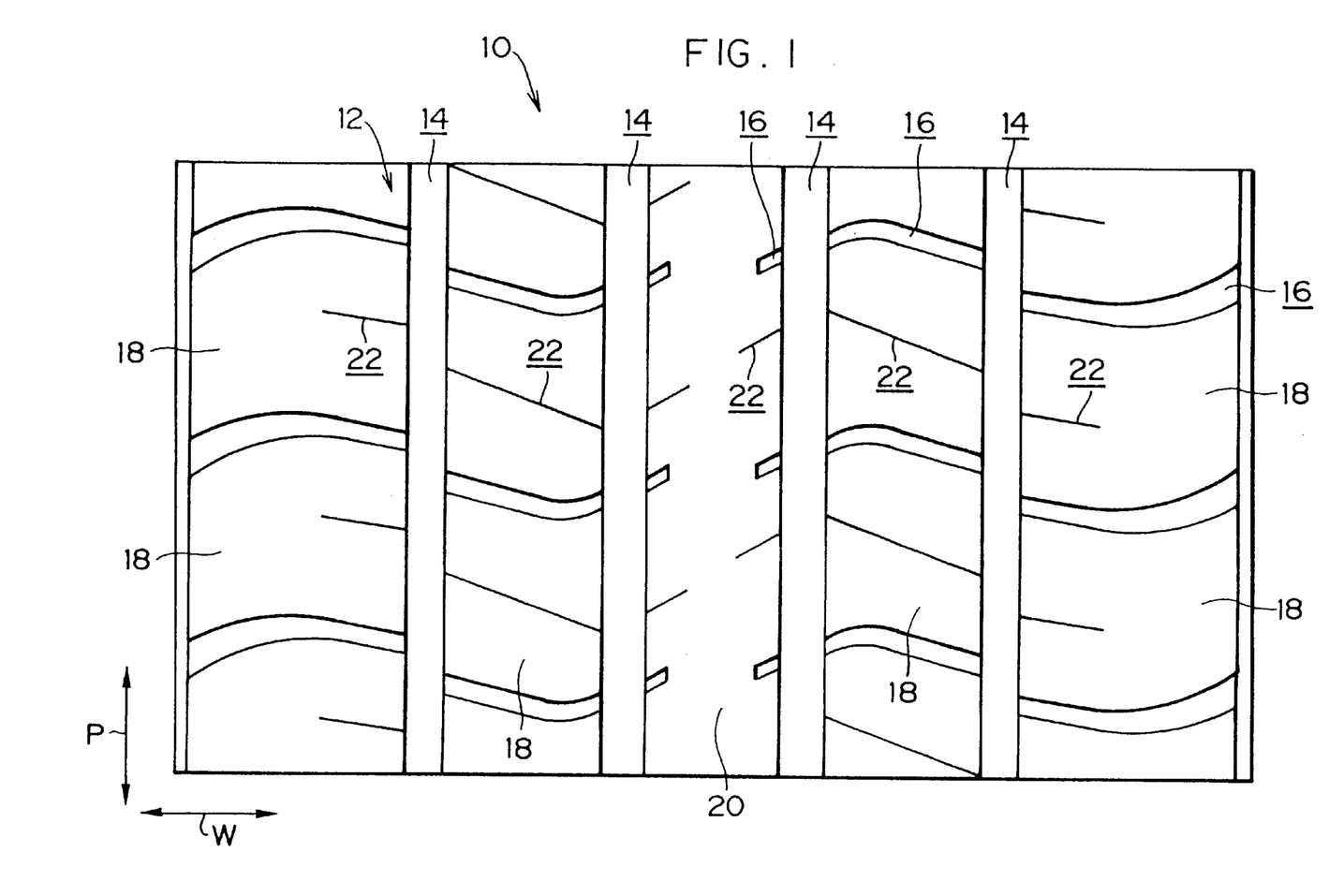
FIG. 1 is a plan view of a tread of a pneumatic tire according to an embodiment of the present invention.

As shown in FIG. 1, a pneumatic tire 10 has a tread 12 which is formed in a cylindrical shape and spans between a pair of left and right sidewalls (not shown). A plurality of main grooves 14 and a plurality of lug grooves 16 are formed in the tread 12. The main grooves 14 are formed along the peripheral direction of the tire 10 (hereinafter, direction p). The lug grooves 16 are formed along the widthwise direction of the tire 10 (hereinafter, direction W). A plurality of blocks 18 and a rib 20, which extends along the peripheral direction of the tire 10, are demarcated by the main grooves 14 and the lug grooves 16. Sipes 22 which extend substantially along direction W of the tire 10 are formed in the blocks 18 and the rib 20.

Figure 2:
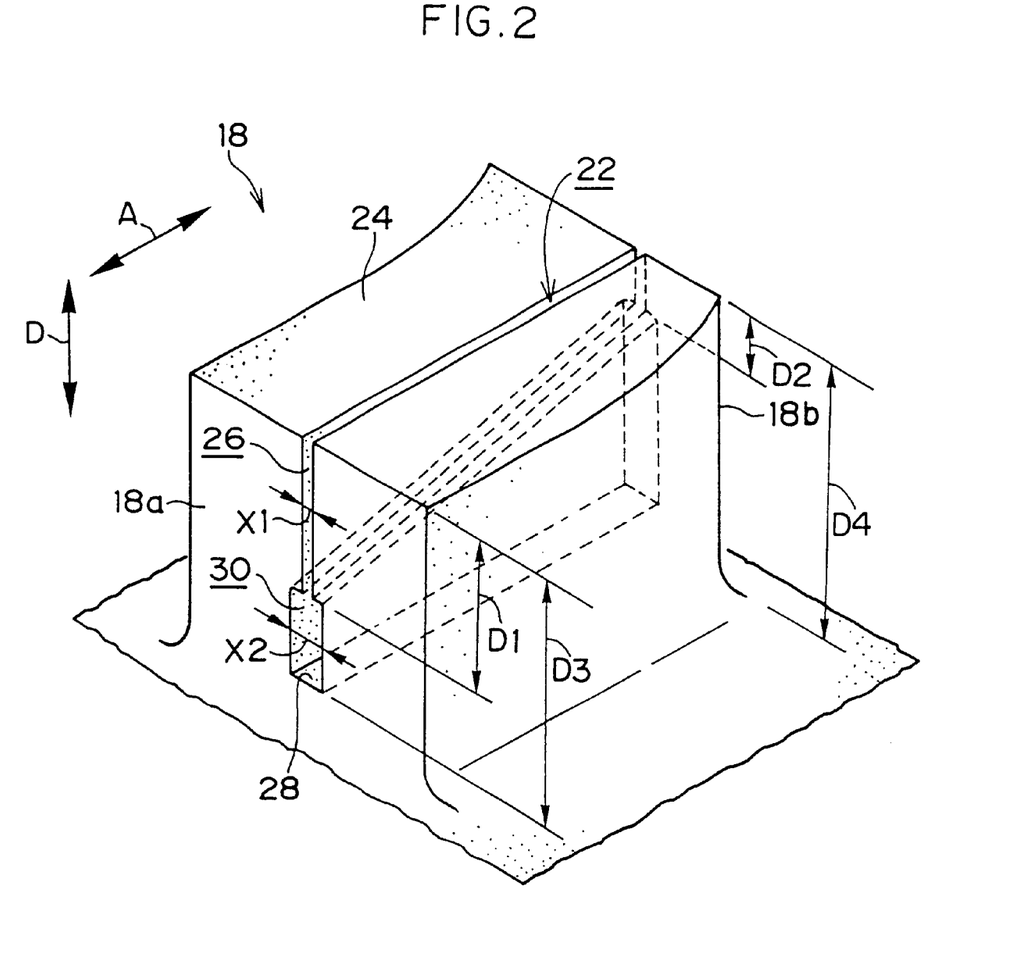
FIG. 2 is a perspective view of a block on which a both-sides-open sipe is formed according to the present embodiment.
Figure 3:
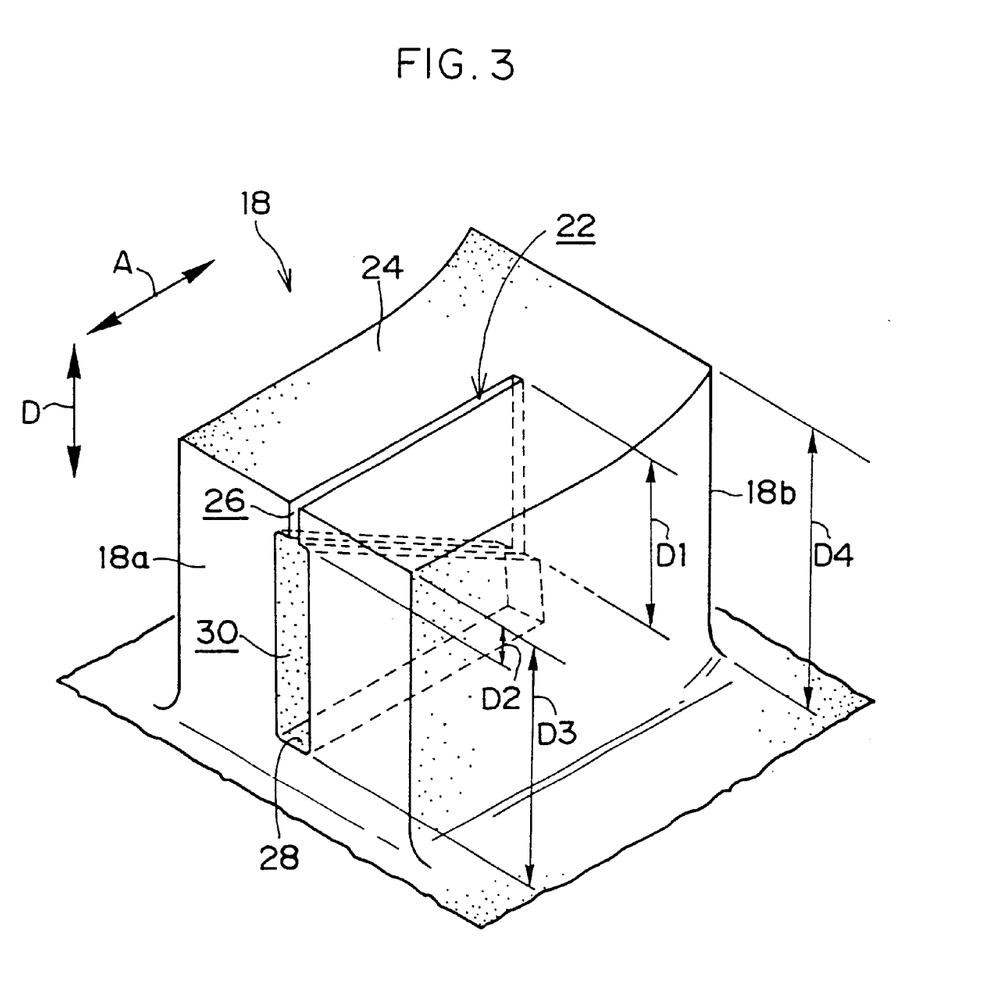
FIG. 3 is a perspective view of a block in which a one-side-open sipe is formed according to the present embodiment.

Perspective views of block models which have a one-side-open sipe and a both-sides-open sipe are shown in FIGS. 2 and 3, respectively.

The sipe 22 which is shown in FIG. 2 is a both-sides-open type of sipe whose end portions are open at the end surfaces of the block. The sipe 22 is formed by a narrow groove portion 26, whose width is X1 and which is formed at a ground-contact surface 24 side of the block 18, and a wide groove portion 30, whose width is X2 (X2>X1) and which is formed at the bottom portion 28 side of the sipe 22, in the depthwise direction of the block 18 (hereinafter, direction D). At a block end portion 18a, the connecting portion of the narrow groove portion 26 and the wide groove portion 30 is positioned at a depth D1 from the ground-contact surface 24. At a block end portion 18b, the connecting portion of the narrow groove portion 26 and the wide groove portion 30 is positioned at a depth D2 from the ground-contact surface 24, wherein D1>D2. Namely, the aforementioned connecting portion is structured such that, in the longitudinal direction of the block 18 (hereinafter, direction A), the proportion of the sipe 22 occupied by the wide groove portion 30 in direction D increases from the block end portion 18a to the block end portion 18b.

Because the sipe 22 is structured as described above, from the ground-contact surface 24 to the depth D2 in direction D, the sipe 22 in direction A is formed only by the narrow groove portion 26. Further, from the depth D1 in direction D to the bottom portion 28, the sipe 22 in direction A is formed only by the wide groove portion 30.

The length of each of D1 and D2 is not particularly specified. However, preferably, D1/D3=0.60 and D2/D3= 0.10, wherein the total depth of the sipe 22 is D3.

This is because, at the initial stage of wear of a tire during which the tread (the blocks 18 and the rib 20) of the tire is worn to a position at a depth of 10% of the total depth D3 of the sipe 22, the deterioration in the draining performances of the main grooves 14 and the lug grooves 16 is low such that, in actual experiments, no difference in wet performance is detected between a new tire and a tire worn as much as 10% of the total depth D3 of the sipe 22. Because the draining performance of the main grooves 14 and the lug grooves 16 is sufficient during the initial stage of wear, the sipe 22 need not exhibit draining performance. Therefore, the sipe 22 is structured only by the narrow groove portion 26, which can keep noise low, until a position at a depth of 10% of the total depth D3 of the sipe 22 from the ground-contact surface 24.

When the tread is worn to 60% of the total depth D3, the depth of the sipe 22 is sufficiently small, and although the sipe 22 is structured only by the wide groove portion 30, there is no increase in noise. Accordingly, the sipe 22 is structured merely by the wide groove portion 30 in order to greatly compensate for the deterioration in the draining performance of the main grooves or the like.

The sipe 22 which is shown in FIG. 3 is a one-side-open type of sipe whose one side is open at one of the end surfaces of the block 18. The sipe 22 has substantially the same shape as the sipe 22 which is shown in FIG. 2. However, in the sipe 22 of FIG. 3, the side of the sipe 22 at which the ratio of the sipe 22 occupied by the wide groove portion 30 is larger in direction D (i.e., the side at which the wide groove portion 30 reaches the vicinity of the ground-contact surface 24) is open at the block end portion 18a side. Accordingly, because the wide groove portion 30 of the sipe 22 becomes larger toward the block end portion 18a, the water which is absorbed by the sipe 22 drains toward the block end portion 18a side effectively.

The following effects are obtained by the traveling of a vehicle on which are mounted pneumatic tires 10 each having the rib 20 and blocks 18 in which the sipes 22 are formed.

Figure 4:
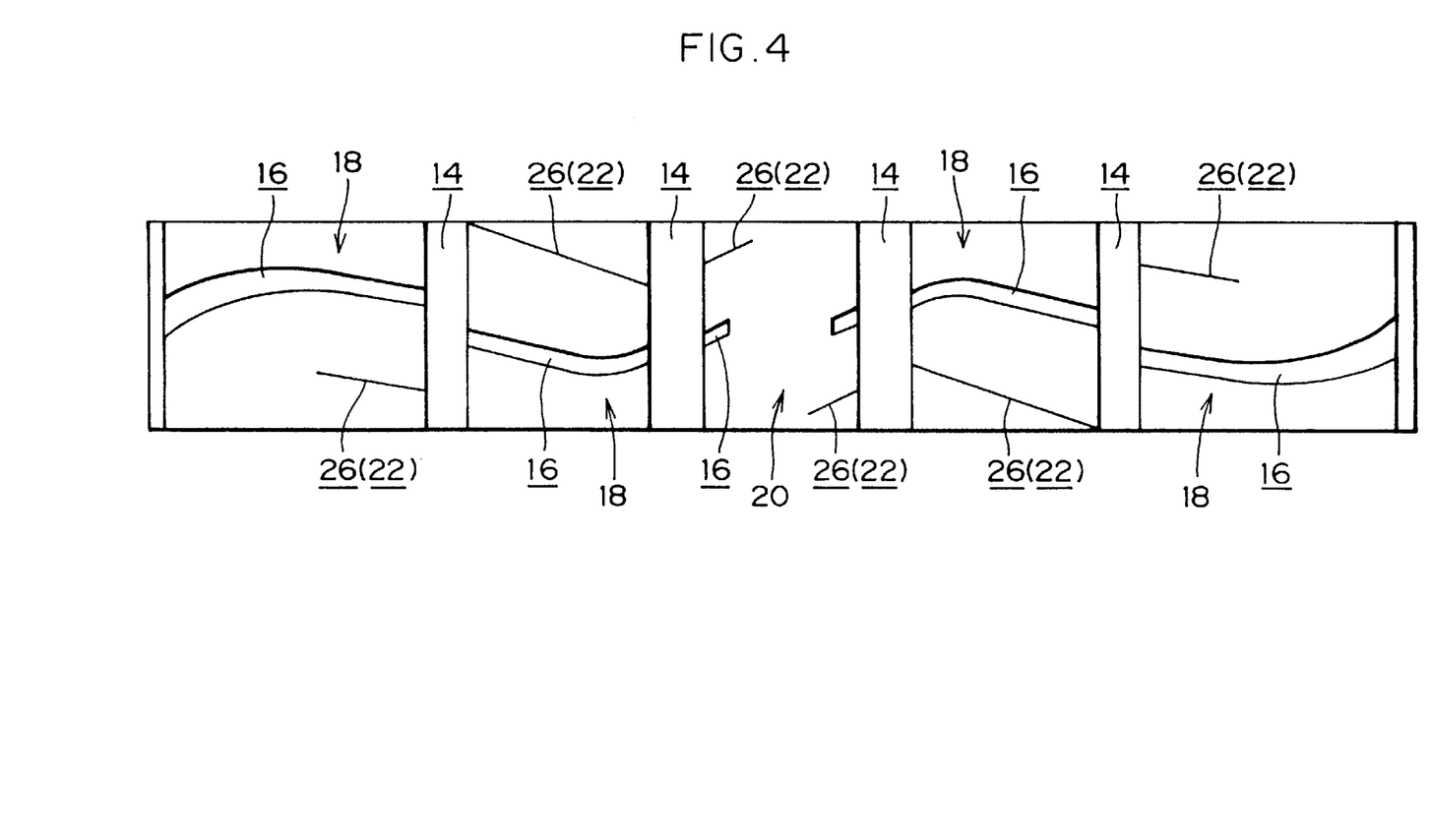
FIG. 4 is a plan view which illustrates a state of an initial stage of wear of a tread of the pneumatic tire according to the present embodiment.
Figure 5:
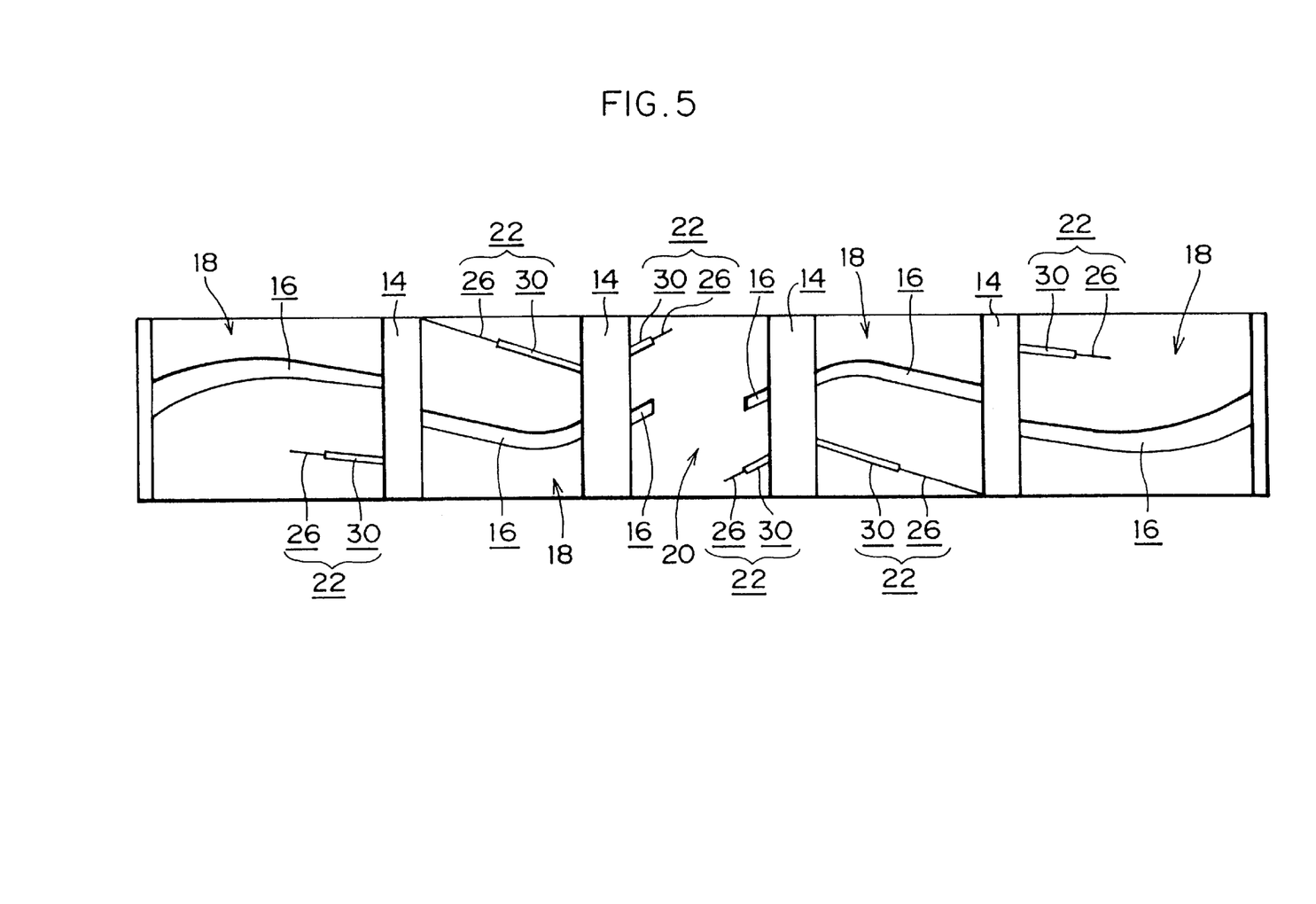
FIG. 5 is a plan view which illustrates a state of an intermediate stage of wear of the tread of the pneumatic tire according to the present embodiment.
Figure 6:
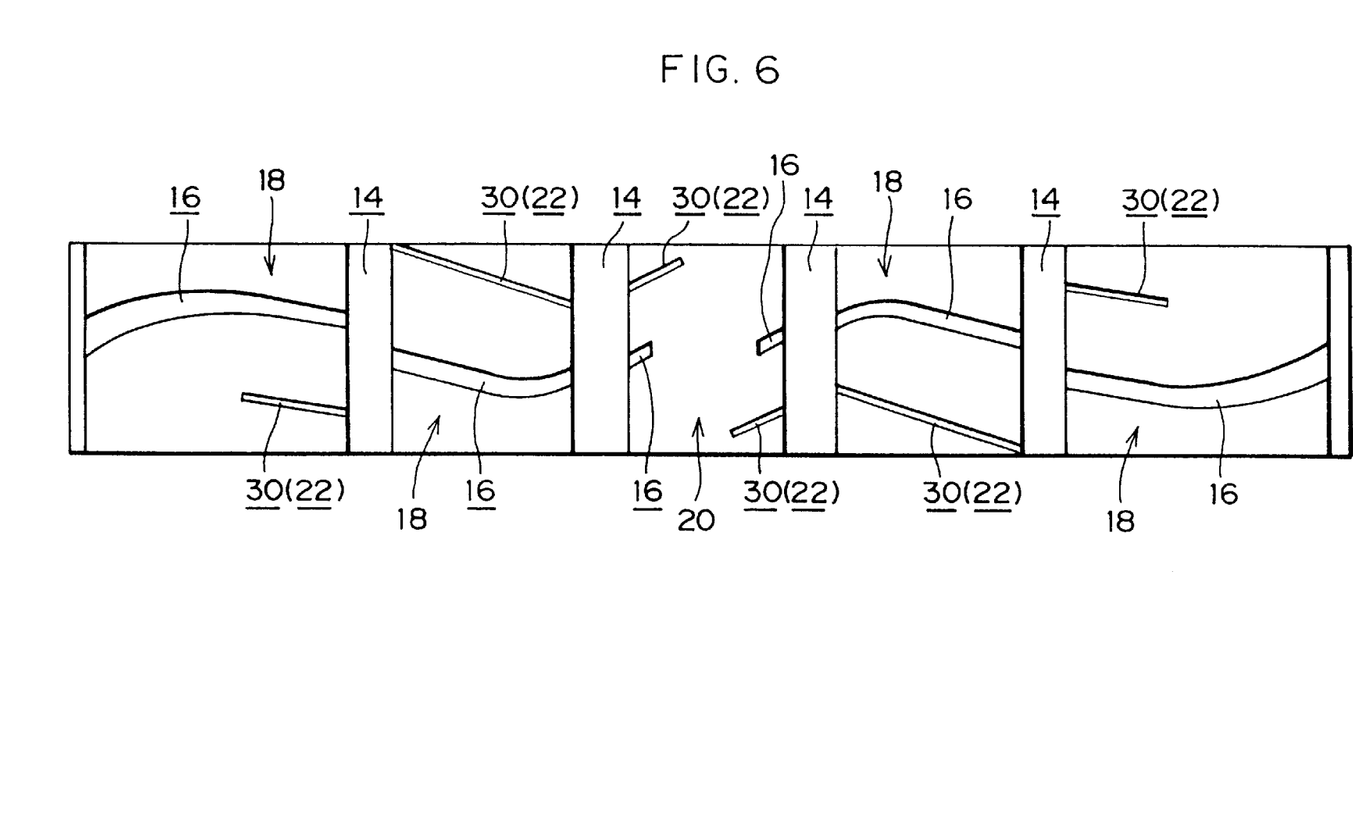
FIG. 6 is a plan view which illustrates a state of a final stage of wear of the tread of the pneumatic tire according to the present embodiment.

The states of the pneumatic tire 10 at the initial stage, intermediate stage and final stage of wear of the tread thereof are shown in FIGS. 4 to 6, respectively.

The tread is worn from the tread surface to 20% of the total depth D4 of the main groove 14 at the initial stage of wear, the tread is worn between 20% and 60% of the total depth D4 at the intermediate stage of wear, and the tread is worn between 60% and 80% of the total depth D4 at the final stage of wear. In the case of the present embodiment, the portion of the tread at a position 80% or more of the total depth D4 from the ground-contact surface 24 is a region which cannot be used.

When the total depth D3 of the sipe is set to be equal to 80% of the total depth D4 of the main groove 14, at the initial stage of wear, as shown in FIG. 4, because only the narrow groove portions 26 of the sipes 22 are exposed (or only small portions of the wide groove portions 30 are exposed) at the ground-contact surface sides of the blocks 18 and the rib 20, the surface area of the exposed portion of each sipe 22 is small enough to prevent an increase in noise. Further, the main grooves 14 and the lug grooves 16 are deep enough to provide satisfactory draining performance. Moreover, the sipes 22 which are formed in the blocks 18 and the rib 20 act as edge components.

At intermediate stage of wear, as the wear proceeds toward the bottom portions 28 of the sipes 22 formed in the blocks 18 and the rib 20 (see FIGS. 2 and 3), the proportion of the exposed portion of the sipes 22 which is occupied by the wide groove portion 30 increases. Namely, as shown in FIG. 5, the wide groove portion 30 accounts for substantially one half of the exposed portion of the sipe 22. Accordingly, the exposed surface area of the sipe 22 increases, which leads to an improvement in the draining performance. As a result, the deterioration of the wet performance due to a decrease of the depths of the main grooves 14 and the lug grooves 16 can be compensated.

In the final stage of wear of the tire, as shown in FIG. 6, the wide groove portions 30 accounts for all of the exposed portions of the sipes 22. As a result, the exposed surface area of the sipe 22 increases so that the draining performance is maximized. Accordingly, the deterioration of the draining performance due to decrease of the groove depths of the main grooves 14 and the lug grooves 16 can be compensated, and accordingly, a deterioration in the wet performance of the pneumatic tire 10 can be suppressed. Further, in spite of the increase of the surface area of the exposed portion of the sipe 22, because the depth of the sipe 22 decreases, the volume of the sipe 22 becomes smaller, and noise is suppressed as well.

Next, with reference to FIGS. 7 to 9, a method of manufacturing blades used to form the above-described sipes 22, and a method of manufacturing the pneumatic tire 10 by using a vulcanization forming mold will be explained.

Figure 7:
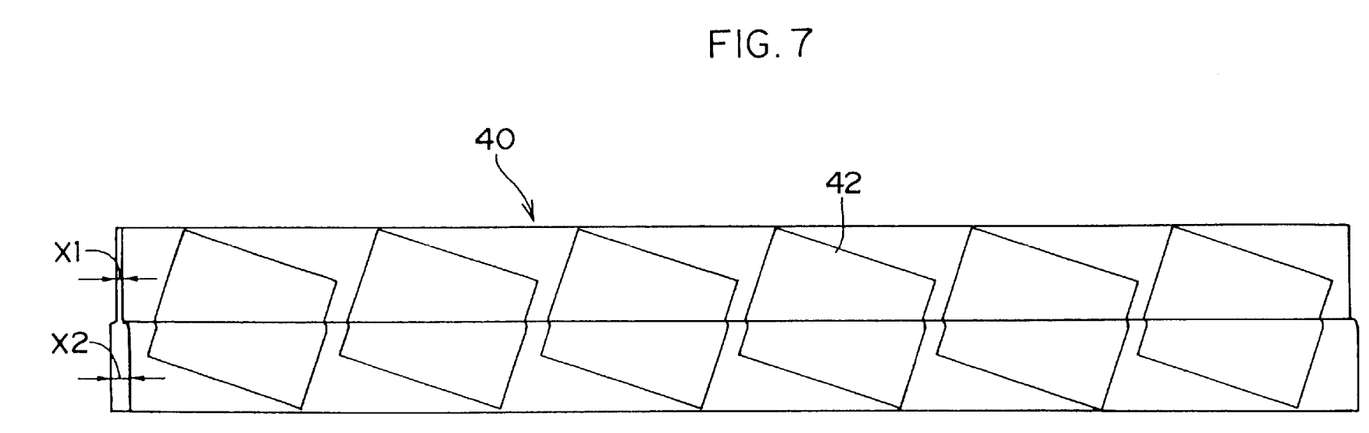
FIG. 7 is a perspective view which illustrates a plate member which is used for manufacturing blades according to the present embodiment.

First, as shown in FIG. 7, a plate member 40, which is formed to have a thickness X1 and a thickness X2 in the widthwise direction thereof and so as to extend in the longitudinal direction thereof, is formed by press or extrusion molding. A plurality of blades 42 are formed to be inclined at a predetermined angle with respect to the longitudinal direction of the plate member 40, and are punched out from the plate member 40 to be formed in substantially rectangular shapes.

Figure 8:
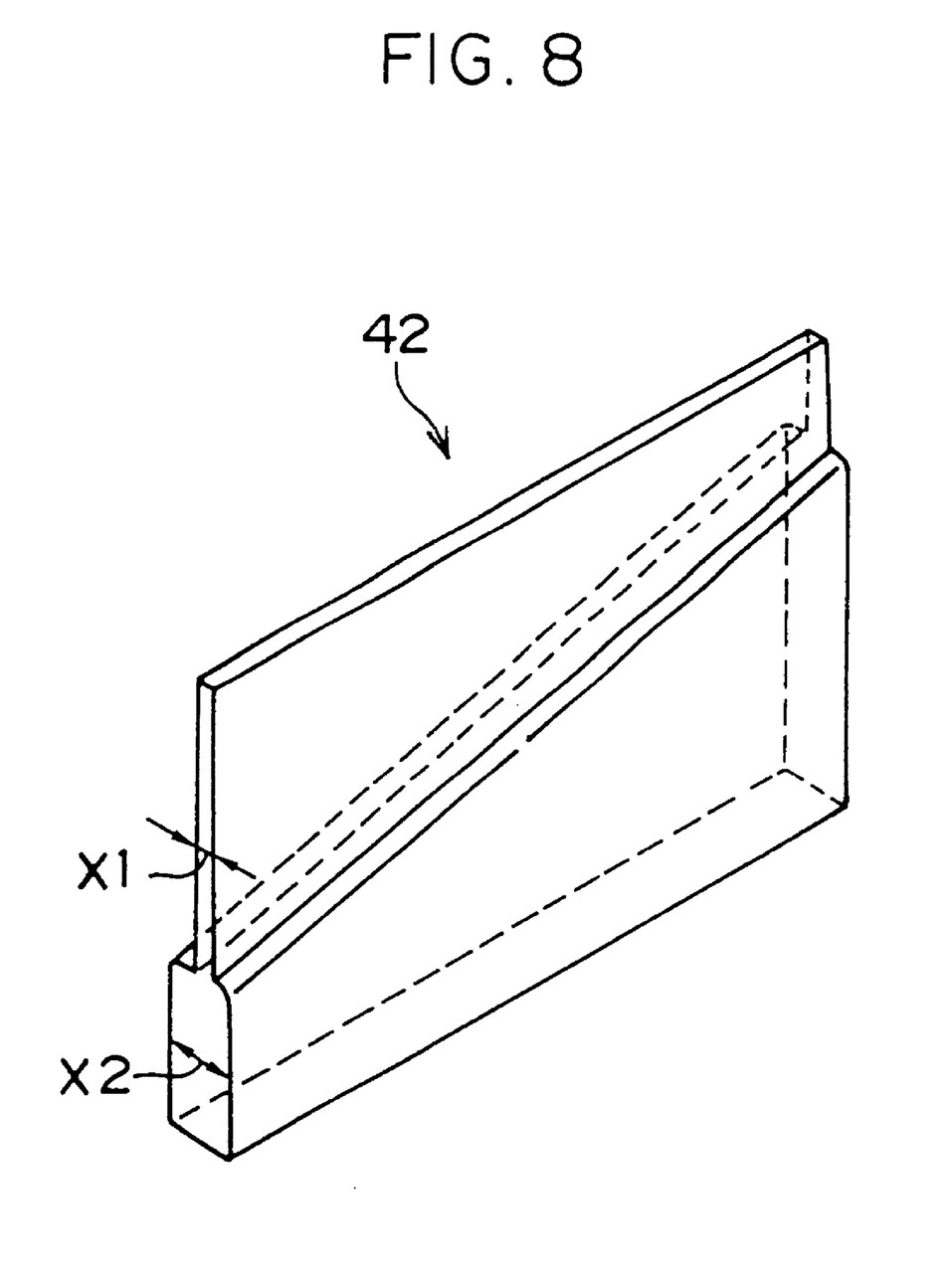
FIG. 8 is a perspective view which illustrates a blade according to the present embodiment.

Accordingly, as shown in FIG. 8, the blade 42, whose portion connecting the region of thickness X1 and the region of thickness X2 is formed along an oblique line, can be manufactured in a simple manner.

Figure 9:
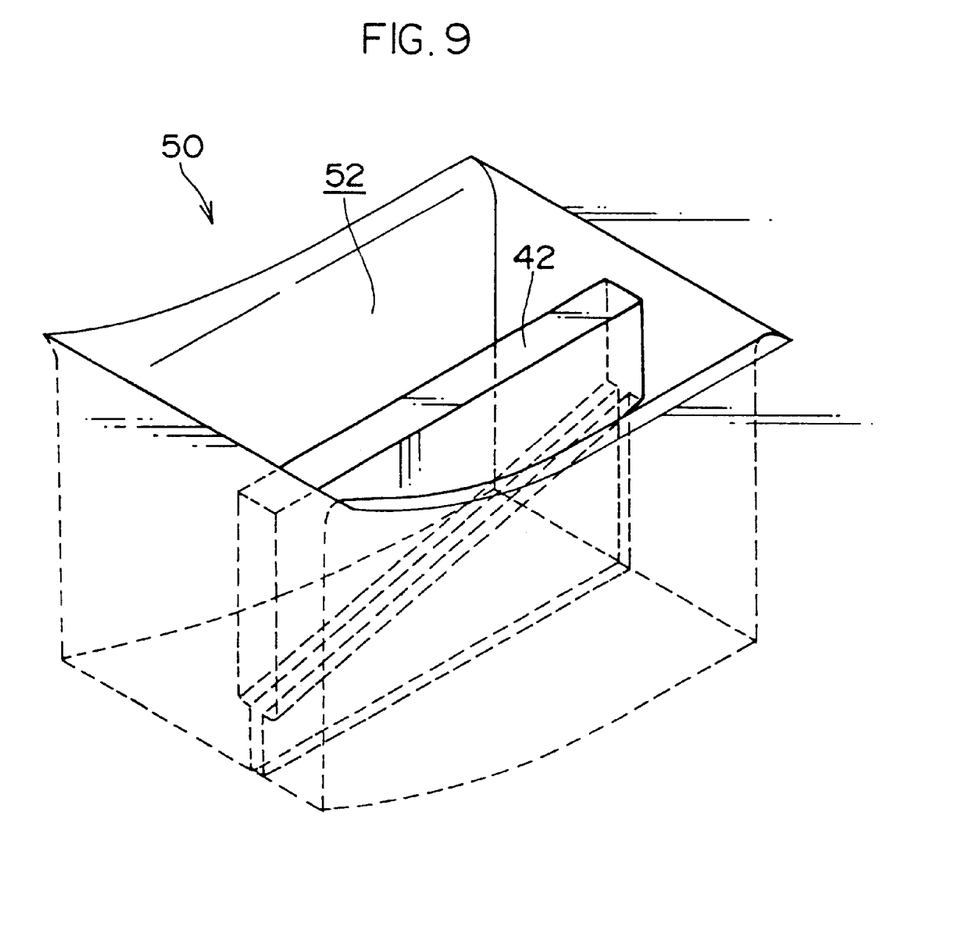
FIG. 9 is a perspective view of a concave portion for forming a block in a vulcanization forming mold.

As shown in FIG. 9, concave portions 52 in which the blocks 18 are formed are provided at a vulcanization forming mold 50. The concave portion 52 is formed in a rectangular parallelepiped shape, and the blade 42 is fixed to the bottom surface and to at least one side surface thereof.

Moreover, a vent hole which is not shown and through which air is ventilated is formed at the bottom surface of the concave portion 52.

The pneumatic tire 10 is manufactured using the vulcanization forming mold 50.

A green tire before vulcanization is filled into the vulcanization forming mold 50. Pressure is applied to the unvulcanized green tire by a bladder (not illustrated) which is disposed inside of the green tire. Accordingly, the rubber of the green tire flows to the concave portion 52. As a result, the air in the concave portion 52 flows to the outside through a vent hole (not illustrated), the rubber of the green tire reaches all of the corner portions of the concave portion 52, and is placed in close contact with the internal surface of the mold. Thereafter, the green tire within the vulcanization forming mold 50 is vulcanized for a predetermined period of time at a predetermined temperature. As a result, the pneumatic tire 10 having the sipes 22 is formed.

Tests were carried out on the pneumatic tire 10 according to the present embodiment thus formed and a comparative tire with respect to the stability and controllability of a vehicle traveling on a dry road and with respect to a vehicle compartment noise.

The tests were carried out by using new tires of the pneumatic tire 10 according to the present embodiment and comparative tire. The comparative tire was a tire on which a tread was formed in the same manner as the pneumatic tire 10, except that all of the sipes are formed to have the same configuration as only the narrow groove portion 26 of the pneumatic tire 10, i.e., were formed to a width X1. The size of the pneumatic tire 10 and the comparative tire was 185/60R14, and the total depth of the sipes was 7.0 mm. The vehicle to which these tires are mounted was a European FF type of vehicle whose rim was 6J-14. The internal pressures of the tires were 2.2 kgf/cm$^2$ at the front side and 2.0 kgf/cm$^2$ at the rear side, respectively.

The stability and controllability on dry roads test was carried out on a track having a lap length of 4 km. In this test, straight driving performance and lane changing performance at speeds between 80 and 140 km/h were tested. Further, a cornering test was carried out on a handling road which was formed in the shape of the letter S at the test course. These performances were rated by the subjective evaluation of a skilled driver.

The noise test was carried out with the vehicle traveling at a low speed of 50 km/h on a straight road whose length was about 300 m. The level of noise was rated in accordance with the subjective evaluation of a skilled driver, and sound pressure was measured by a vehicle compartment mike which was installed in the vicinity of the ears of the driver. The vehicle compartment noise was expressed as indices with the vehicle compartment noise of the comparative tire being an index of 100 (higher values are better).

The results of the tests are shown in following Table 1.

TABLE 1

|  | Stability and controllability on dry road | Subjective evaluation of noise | Index of measurement of vehicle compartment noise |
|---|---|---|---|
| Comparative tire | 6.0 | 6.0 | 100.0 |
| Tire of the present invention | 5.9 | 6.0 | 99.5 | wherein the degrees of the feeling evaluation were as follows:

9: completely satisfied
8: very satisfied
7: satisfied
6: just barely satisfied
5: anyway satisfied
4: permissible
3: slightly unsatisfied
2: rather unsatisfied In this way, although the tire according to the present invention is slightly inferior to the comparative tire in terms of stability and controllability on dry roads, there was hardly any difference. The reason for this is that because the narrow groove portion 26 is formed at the ground-contact surface 24 side of the sipe 22 which is formed in the tread surface (in the blocks 18 and the rib 22) of the pneumatic tire 10 according to the present embodiment, the rigidity of the tire can be reliably maintained. In addition, in the initial stage of wear of the tread, the exposed portion of the sipe 22 is only formed by the narrow groove portion 26, and thus noise can be kept low.

Next, a wet performance test will be explained with reference to Table 2.

The wet performance test was carried out by a skilled driver driving a vehicle, to which test tires are mounted, on a course whose length was 700 m and which was covered to a water depth of 2 mm, and the driver subjectively evaluating the braking performance (maximum: 10 points; the higher the better). Further, the braking distance until a complete stop due to the full braking of the vehicle at a running speed of 50 km/h was expressed as an index (the higher the better) to evaluate the braking. The braking index of 100 was given to the braking distance of the comparative tire when new.

Further, because the total depth of the main groove was 8.5 mm, wear of 3 mm means wear of about 35% of the tread, and wear of 6 mm means wear of about 70%. Accordingly, wear of 3 mm and wear of 6 mm correspond to the initial stage of wear and the final stage of wear, respectively. The total depth of the sipe is 7 mm. These and these states are shown in FIGS. 5 and 6.

TABLE 2

|  |  | Feeling evaluation points | Braking index |
|---|---|---|---|
| Comparative tire | New tire | 6.5 | 100 |
|  | 3 mm wear | 5.0 | 93 |
|  | 6 mm wear | 4.5 | 84 |
| Tire of the present invention | New tire | 6.6 | 101 |
|  | 3 mm wear | 5.9 | 95 |
|  | 6 mm wear | 5.5 | 92 |

In this way, even when the tire according to the present invention is worn, the rate of deterioration in the braking performance of the tire according to the present invention is mild as compared to the comparative tire. It is concluded that, this effect is because, as wear advances, more and more of the wide groove portion 30 is exposed such that the surface area of the sipe 22 increases, and the draining performance of the sipe 22 is thereby improved so that the deterioration in the draining performance of the main grooves 14 can be compensated. Namely, the deterioration in the wet performance of the pneumatic tire 10 which accompanies wear of the tire can be suppressed.

Figure 10:
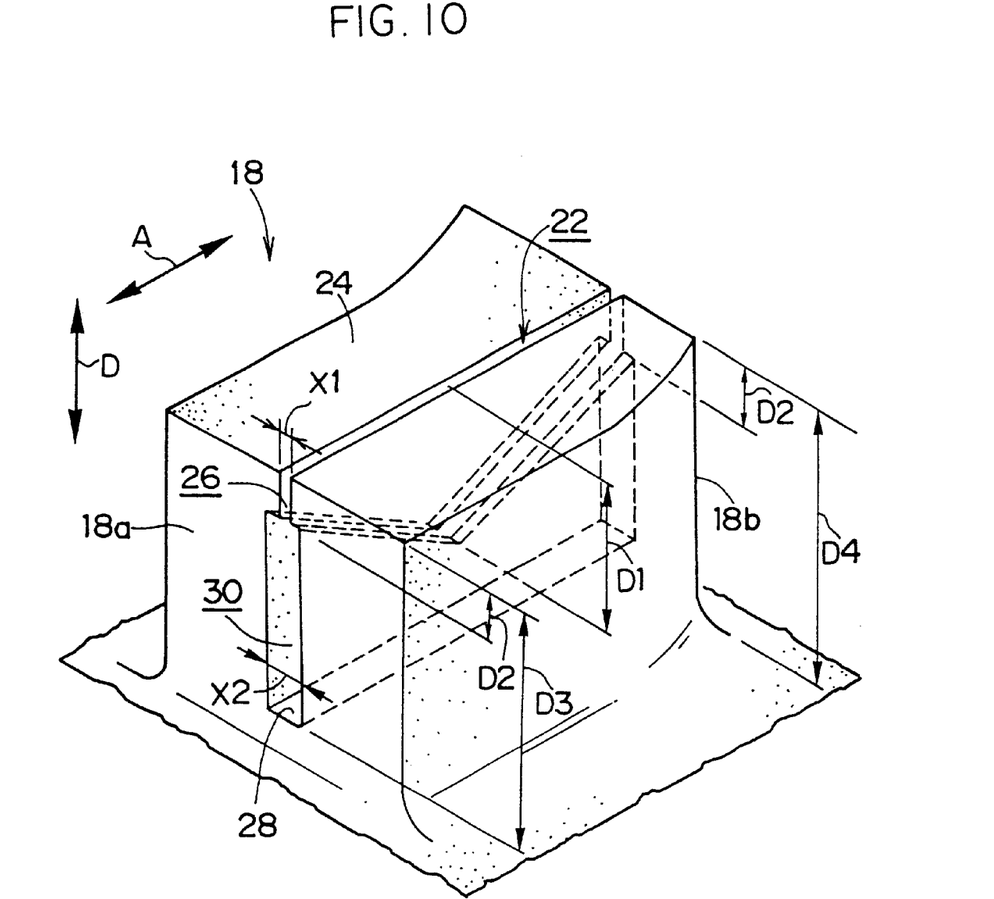
FIG. 10 is a perspective view of another block in which a both-sides-open sipe according to the present embodiment is formed.

The both-sides-open sipe which is formed in each of the blocks 18 of the pneumatic tire 10 according to the present embodiment, may be formed in a configuration such as that shown in FIG. 10. Namely, the proportion of the sipe 22 occupied by the wide groove portion 30 is increased toward each of the end portions 18*a* and 18*b* of the block 18 from the intermediate position of the sipe 22 in direction A (in this case, at a position which is spaced apart from the block end portions 18*a* and 18*b* by equal distances). Accordingly, the performance of draining from the sipe 22 to the main grooves 14 improves at the end portions 18*a* and 18*b*. As a result, the wet performance in the pneumatic tire 10 is even further improved.

As described above, the pneumatic tire according to the present invention can maintain an excellent draining performance from the initial stage of wear of the tire through the final stage of wear, and can suppress noise. In particular, because the exposed portion of a sipe gradually becomes larger as the groove depth of the tire decreases due to wear, the sipe can compensate for the deterioration in draining performance of the grooves so that an excellent draining performance of the tire can be maintained.

What is claimed is:

1. A pneumatic tire comprising; a tread on which a plurality of block-shaped land portions which are demarcated by a plurality of grooves intersecting each other and a rib are formed, and in which sipes are provided in a block-shaped land portion or the rib, wherein said sipe is structured by a narrow groove portion, which is formed at a tire ground-contact surface side of said sipe and has a first width, and a wide groove portion, which is formed at a bottom portion side of said sipe and has a second width greater than the first width, and said sipe is an open sipe in which at least one of the longitudinal direction end portions of said sipe is open at a groove of said plurality of grooves, and said wide groove portion is formed continuously in the longitudinal direction of said sipe from at least one of the end portions thereof, and toward the bottom portion of said sipe, the proportion of said sipe accounted for by said narrow groove portion in a longitudinal direction of said sipe which is orthogonal to a depthwise direction of said sipe decreases, while the proportion of said sipe accounted for by said wide groove portion in the longitudinal direction of said sipe which is orthogonal to the depthwise direction of said sipe increases throughout the longitudinal direction of said sipe from one end portion of the sipe to the other end portion.

2. A pneumatic tire according to claim 1, wherein said sipe is a one-side-open sipe in which one of the longitudinal direction end portions of said sipe is open at a groove of said plurality of grooves, and in the longitudinal direction of said sipe, the proportion of said sipe accounted for by said wide groove portion in the depthwise direction of said sipe increases toward said the one end portion of said sipe.

3. A pneumatic tire according to claim 1, wherein said sipe is a both-sides-open sipe in which both longitudinal end portions of said sipe are open at grooves of said plurality of grooves, and the proportion of said sipe accounted for by said wide groove portion in the depthwise direction of said sipe increases toward the end portions from an intermediate portion between the end portions of said sipe in the longitudinal direction thereof.

4. A pneumatic tire according to claim 1, wherein said sipe is formed only by said narrow groove portion from a tire ground-contact surface to a first depth.

5. A pneumatic tire according to claim 4, wherein said first depth is a depth at a position of 10% of the total depth of said sipe from the tire ground-contact surface.

6. A pneumatic tire according to claim 1, wherein said sipe is formed only by said wide groove portion from a second depth to a bottom portion of said sipe.

7. A pneumatic tire according to claim 6, wherein said second depth is a depth at a position of 60% of the total depth of said sipe from a tire ground-contact surface.

8. A pneumatic tire according to claim 1, wherein the proportion of said sipe accounted for by said narrow groove portion in the depthwise direction of said sipe gradually changes in the longitudinal direction.

9. A pneumatic tire according to claim 8, wherein the proportion of said sipe accounted for by said narrow groove portion in the depthwise direction of said sipe changes in the longitudinal direction at a constant rate along the entire length of the sipe in the longitudinal direction of the sipe.

10. A pneumatic tire according to claim 8, wherein the proportion of said sipe accounted for by said wide groove portion in the depthwise direction of said sipe gradually changes in the longitudinal direction throughout the longitudinal direction of the sipe in a manner complimentary to the proportion of said sipe accounted for by said narrow groove portion.

11. A pneumatic tire according to claim 1, wherein the proportion of said sipe accounted for by said narrow groove portion in the longitudinal direction of said sipe gradually decreases in the depthwise direction from 100%, the decrease starting at a depthwise direction position shifted a predetermined distance from the tire ground-contact surface and the proportion of said sipe accounted for by the narrow groove becoming 0% at another depthwise direction position located closer to the bottom portion of the sipe, and the proportion of said sipe accounted for by said wide groove portion in the longitudinal direction of said sipe gradually increases from 0% in a depthwise direction, the increase starting at the depthwise direction position and the proportion of said sipe accounted for by the wide groove becoming 100% at another depthwise direction position.

12. A pneumatic tire according to claim 11, wherein the depthwise direction position shifted a predetermined distance from the tire ground-contact surface is a position at a depth of 10% of the total depth of the sipe from the tire ground-contact surface.

13. A pneumatic tire according to claim 11, wherein another depthwise direction position closer to the bottom portion of the sipe is a position at a depth of 60% of the total depth of the sipe from the tire ground-contact surface.

14. A pneumatic tire comprising; a tread on which a plurality of block-shaped land portions which are demarcated by a plurality of grooves intersecting each other and a rib are formed, and in which a sipe is provided in a block-shaped land portion or the rib, wherein said sipe is a one-side-open sipe in which one of the longitudinal direction end portions of said sipe is open at one of said plurality of grooves, and said sipe is structured by a narrow groove portion, which is formed at a tire ground-contact surface side of said sipe and has a first width, and a wide groove portion, which is formed continuously in the longitudinal direction of said sipe at a bottom portion side of said sipe and has a second width greater than the first width, and in a longitudinal direction of said sipe which is orthogonal to the depthwise direction of said sipe, the proportion of said sipe accounted for by said wide groove portion in the depthwise direction of said sipe increases toward the one end portion of said sipe throughout the longitudinal direction of said sipe from one end portion of the sipe to the other end portion.

15. A pneumatic tire according to claim 14, wherein said sipe is formed only by said narrow groove portion from a tire ground-contact surface to a first depth.

16. A pneumatic tire according to claim 15, wherein said first depth is a depth at a position of 10% of the total depth of said sipe from the tire ground-contact surface.

17. A pneumatic tire according to claim 14, wherein said sipe is formed only by said wide groove portion from a second depth to a bottom portion of said sipe.

18. A pneumatic tire according to claim 17, wherein said second depth is a depth at a position of 60% of the total depth of said sipe from a tire ground-contact surface.

19. A pneumatic tire comprising; a tread on which a plurality of block-shaped land portions which are demarcated by a plurality of grooves intersecting each other and a rib are formed, and in which a sipe is provided in a block-shaped land portion or the rib, wherein said sipe is a both-sides-open sipe in which both longitudinal end portions of said sipe are open at grooves of said plurality of grooves, and said sipe is structured by a narrow groove portion, which is formed continuously in the longitudinal direction of said sipe at a tire ground-contact surface side of said sipe and has a first width, and a wide groove portion, which is formed at a bottom portion side of said sipe and has a second width greater than the first width, and in a longitudinal direction of said sipe which is orthogonal to a depthwise direction of said sipe, from an intermediate portion between the end portions of said sipe toward the end portions, the proportion of said sipe accounted for by said wide groove portion in the depthwise direction of said sipe from said intermediate portion outward to each of said end portions increases throughout the longitudinal direction of the sipe.

20. A pneumatic tire according to claim 19, wherein said sipe is formed only by said narrow groove portion from a tire ground-contact surface to a first depth.

21. A pneumatic tire according to claim 20, wherein said first depth is a depth at the position of 10% of the total depth of said sipe from the tire ground-contact surface.

22. A pneumatic tire according to claim 19, wherein said sipe is formed only by said wide groove portion from a second depth to a bottom portion of said sipe.

23. A pneumatic tire according to claim 22, wherein said second depth is a depth at the position of 60% of the total depth of said sipe from a tire ground-contact surface.

* * * * *